3,105,038
**PROCESS FOR REMOVING METAL CONTAMI-
NANTS FROM PETROLEUM OIL**
George W. Ayers, Chicago, Ill., assignor to The Pure Oil
Company, Chicago, Ill., a corporation of Ohio
No Drawing. Filed June 9, 1961, Ser. No. 115,936
11 Claims. (Cl. 208—251)

This invention relates to a process for the removal of metal contaminants from petroleum oils and, more particularly, to the removal of vanadium and nickel contaminants from a petroleum oil by contacting the oil with a sulfonated polystyrene or polystyrene-divinylbenzene resin.

The presence of certain metal contaminants in crude oils and fractions thereof is undesirable. Particularly objectionable is the presence of vanadium and nickel in the form of porphyrin complexes. Even when the concentration of these metal-porphyrin complexes is relatively small, that is, on the order of parts per million, their presence causes serious difficulties in the refining and utilization of heavy petroleum oils. The presence of an appreciable quantity of these contaminants in catalytic-cracking feed-stocks causes rapid deterioration of the cracking catalysts, and changes the selectivity of the catalysts in the direction of more of the charge stock being converted to coke. In addition to the deleterious effects of vanadium in the catalytic cracking of oil, severe corrosion problems may be encountered during the combustion of heavy fuel oil containing vanadium. The vanadium and nickel are held so tenaciously in their oil-soluble porphyrin complexes that most conventional treating methods and agents are ineffective in removing them from the oil. Selective solvents can be used to extract these contaminants to a limited extent. However, the use of selective solvents such as phenol will result in a substantial portion of the oil treated being extracted along with the contaminants. Propane-deasphalting also removes some of the nickel and vanadium porphyrin complexes from oils, the complexes being thrown out of the oil with the asphaltic bodies. Except for the production of cracking stocks, distillation is ineffective for the removal of these metal-porphyrin complexes from oils, since they distill at temperatures above 1075° F. (equivalent atmospheric boiling point) and, therefore, they are found in appreciable amounts in many oil fractions boiling above the temperature.

In accordance with this invention, I have found that the vanadium and nickel present in an oil in the form of metal-porphyrin complexes can be removed by contacting the oil with a cation-exchange resin, specifically a granular sulfonated polystyrene-divinylbenzene resin. I have also found that the contaminants can be removed from the resin, and the resin regenerated for further use, by treatment with aqueous sulfuric acid solution. When the metal-porphyrin complexes are decomposed by the granular sulfonated polystyrene-divinylbenzene resin, the metal contaminants removed from the oil are involved in salt formation with the sulfonic acid groups on the resin. In the regeneration of the spent resin, the metals are removed by the aqueous sulfuric acid solution as sulfates, regenerating the sulfonic acid groups in the resin.

It is therefore a primary object of this invention to provide a process for removing metal contaminants from petroleum oils.

It is another object of this invention to provide a refining process for removing vanadium and nickel contaminants, present in petroleum oils as metal-porphyrin complexes, by treatment with a cation-exchange resin.

It is another object of this invention to provide a method for refining petroleum oils using a sulfonated polystyrene or polystyrene-divinylbenzene resin which can be regenerated.

These and further objects of the invention will become apparent as the description of the invention proceeds.

The oil or oil fractions which can be treated by the process of this invention include any containing metal contaminants, particularly vanadium and nickel in the form of metal-porphyrin complexes, which it is desirable to remove. For example, crude petroleum, high-boiling distillates, bottom fractions from atmospheric and vacuum distillation towers, cracked residuum, blends of heavy oils, and oils which have been first subjected to some other standard refining process, such as deasphalting or dewaxing, can be treated by the process of this invention.

Sulfonated polystyrene or polystyrene-divinylbenzene resin suitable for carrying out the process of this invention can be made by (1) sulfonation of high-molecular-weight, oil-insoluble polystyrene or polystyrene-divinylbenzene, (2) polymerization of styrene which already contains sulfonic acid groups, or (3) co-polymerization of sulfonated styrene with divinylbenzene modified so as to contain sulfonic acid groups. The sulfonated polystyrene or polystyrene-divinylbenzene resin granules must be of suitable size for a packed bed and must have sufficient strength to resist crushing in a packed bed. The sulfonated polystyrene or polystyrene-divinylbenzene resin must have a molecular weight of at least about 500,000 and preferably above one million. A suitable sulfonated polystyrene-divinylbenzene resin of this type is Amberlyst 15 marketed by Rohm and Haas Company.

The vanadium and nickel contaminants removal is controlled by the contact temperature and time allowed for contacting. The temperature at which the oil is treated with the resin should be within the range of about 250° F. to about 400° F., preferably as high as possible without causing softening of the resin since the rate of removal of the contaminants is greater at the higher temperatures. Amberlyst 15 can be used readily at 356° to 365° F. with no visible deterioration. The treatment of the oil may be carried out at pressures ranging from subatmospheric to superatmospheric. The decomposition of the metal-porphyrin complexes is not instantaneous, but requires a contact period of at least about 10 minutes.

When the resin becomes saturated with the contaminants removed from the oil so that its ability to remove more contaminants is impaired, it can be regenerated. This is accomplished by first washing the resin with a solvent such as benzene or naphtha to remove the oil contained therein. The resin is then contacted with an aqueous sulfuric acid solution, having a concentration ranging from about 1 to 50%, to remove the metals as sulfates and regenerate the sulfonic acid groups in the resin. The regeneration of the spent resin is carried out at a temperature between ambient and 212° F. The dilute acid may be used in regenerating numerous beds of spent resin if a small amount of essentially fresh solution is added at the end of each regeneration. If desired, phosphoric acid, hydrochloric acid, or other mineral acid may be used for the regeneration.

In carrying out the process of this invention, the treatment of oils may be batch-wise or continuous. As an example of this invention, a residual oil boiling above 1075° F. at equivalent atmospheric pressure is obtained from a conventional distillation tower. This oil, which contains vanadium and nickel in the form of porphyrin complexes, is introduced into the top of a vertical adsorption tower containing a bed of granular sulfonated polystyrene-divinylbenzene resin. The oil is percolated through the bed of resin, maintained at a temperature of 360° F. during its passage therethrough, until substantially all of the vanadium and nickel is removed by the resin. The contaminant-free oil may be used as catalytic-cracking feed-stock. A better grade of catalytic-cracking feed-stock can be obtained by subjecting the oil to propane deasphalting before treating it according to our process. During solvent deasphalting, the asphaltic matter is precipitated, carrying down a large amount of metal-complex. The metal-porphyrin complex remaining in the oil is removed by application of the process of this invention.

The feed is continuously introduced into the adsorption tower until the ability of the resin to remove the metal contaminants in the feed is seriously impaired by the resin becoming saturated with the contaminants. At this point, the flow of feed into the tower is discontinued and benzene or naphtha is introduced into the tower to wash the bed of resin in order to remove adherent oily material. The solvent used in washing the bed is then subjected to any suitable stripping operation for the purpose of separating the solvent from the oil. The solvent may then be used again for removing oil retained by the spent resin. The oil recovered from the stripping operation is also suitable for use as feed-stock for a catalytic-cracking operation since it is substantially free of the contaminants. After the solvent-washing of the resin is complete, the resin is regenerated by passing an aqueous sulfuric acid solution through the tower, followed by water-washing and steaming.

In order to be able to continuously treat contaminant-containing oil, a plurality of adsorption towers can be used with the provision of a necessary manifold system to switch the various fluid streams. For example, three treating towers can be utilized, each being employed alternately during the treating, solvent-washing, and regeneration phases of the complete cycle. For oils of high contaminant content, it may be necessary to use several towers in series with very slow movement of the oil through the treating beds.

Distillate oils boiling above 1075° F. (equivalent atmospheric temperature) containing appreciable quantities of metal-porphyrin complexes, may also be subjected to the process of this invention for the removal of nickel and vanadium contaminants prior to their use as catalytic-cracking feed-stocks.

The following experiments demonstrate the effectiveness of this invention.

*Example I*

Seventeen grams of a residual oil obtained from Venezuelan crude oil containing 140 p.p.m. of vanadium was heated with 17 grams of Amberlyst 15 sulfonated polystyrene-divinylbenzene spheres at 356–365° F. for one hour. After addition of 50 cc. of benzene to the mixture, the resin spheres were collected on a Büchner funnel and washed thoroughly with benzene to remove any adherent oil material. The resin spheres were then dried and heated with 100 cc. of a 25% sulfuric acid solution at 203–212° F. for one hour. After filtration, the aqueous sulfuric acid solution used in treating the resin was found to contain a large amount of vanadium. Neither the untreated oil nor the treated residual oil contained any water-soluble vanadium compounds. Since the fresh sulfuric acid solution and fresh unused resin contained no vanadium, it was clearly demonstrated that the Amberlyst 15 removed a large amount of vanadium from the vanadium-porphyrin complexes in the residual oil, and that this vanadium was removed from the resin by the sulfuric acid solution.

*Example II*

A heavy gas oil from a vacuum distillation tower, containing 3 p.p.m. of vanadium and 1 p.p.m. of nickel, is passed through a bed of granular sulfonated polystyrene-divinylbenzene resin (Amberylst 15) at a temperature of 356° F. The treated oil is then analyzed for metal content and is found to contain less than 0.5 p.p.m. of vanadium and less than 0.5 p.p.m. of nickel. The resin is washed with benzene to remove the oil which is retained thereon, and then is washed with 20% sulfuric acid solution. On analysis, the sulfuric acid is found to contain vanadium and nickel.

*Example III*

Another sample of the oil treated in Example II is passed through a bed of sulfonated phenol-formaldehyde resin at 300° F. The contact temperature is limited to 300° F. to avoid deterioration of the resin. Upon analysis, the treated oil shows no reduction in vanadium and nickel content.

The foregoing examples are illustrative and non-limiting embodiments of this invention. In general, this invention is intended to encompass the removal of metal contaminants from a petroleum oil by contacting the oil with a sulfonated polystyrene or polystyrene-divinylbenzene resin at a temperature of about 250° to 400° F. Although the foregoing invention is specifically described, there are modifications in the various phases of this invention which will be apparent to those skilled in the art.

The embodiments of the invention in which an exclusive property or privilege is claimed are defined as follows:

1. A process for removing metal contaminants from a petroleum oil containing same which comprises contacting a petroleum oil containing a metal taken from the group consisting of nickel and vanadium in the form of a porphyrin complex with a resin taken from the group consisting of sulfonated polystyrene resin and sulfonated polystyrene-divinylbenzene resin, said resin having a molecular weight of at least about 500,000, and said contacting being carried out at a temperature of about 250° to 400° F. for a period of time sufficient to result in a substantial reduction in the metal-porphyrin complex content of the oil.

2. A process according to claim 1 in which said petroleum oil is passed through a bed of said resin.

3. A process according to claim 1 in which said petroleum oil includes constituents boiling above about 1075° F.

4. A process according to claim 1 in which said petroleum oil is contacted with said resin at a temperature of about 300° to 365° F.

5. A process according to claim 1 in which said petroleum oil is contacted with said resin for a period of at least 10 minutes.

6. A process according to claim 1 in which said resin is periodically regenerated by treatment with an aqueous mineral acid solution.

7. A process according to claim 6 in which said acid is sulfuric acid.

8. A process for removing metal contaminants from a petroleum oil containing same which comprises contacting said oil containing a metal selected from the group consisting of nickel and vanadium in the form of a porphyrin complex with a resin selected from the group consisting of sulfonated polystyrene resin and sulfonated polystyrene-divinylbenzene resin, said resin having a molecular weight of at least about 500,000, said contacting being carried out at a temperature of about 300°–365° F. for a period of at least 10 minutes, whereby the metal-porphyrin complex content of said oil is substantially reduced.

9. A process according to claim 8 in which said resin is a sulfonated polystyrene-divinylbenzene resin 10. A process according to claim 1 in which said resin has molecular weight of over one million.

11. A process according to claim 8 in which said resin has molecular weight of over one million.

References Cited in the file of this patent

UNITED STATES PATENTS

| | | |
|---|---|---|
| 2,367,803 | Schindler et al. | Jan. 23, 1945 |
| 2,375,694 | Schutze | May 8, 1945 |
| 2,769,787 | Diamond | Nov. 6, 1956 |
| 2,810,692 | Calmon | Oct. 22, 1957 |
| 2,891,916 | Hwa | June 23, 1959 |

UNITED STATES PATENT OFFICE
CERTIFICATE OF CORRECTION

Patent No. 3,105,038            September 24, 1963

George W. Ayers

It is hereby certified that error appears in the above numbered patent requiring correction and that the said Letters Patent should read as corrected below.

Column 4, list of References Cited, add the following:

2,566,353     Mills ----- Sept. 4, 1951

Signed and sealed this 7th day of April 1964.

(SEAL)
Attest:

ERNEST W. SWIDER
Attesting Officer

EDWARD J. BRENNER

Commissioner of Patents